(12) United States Patent
Sperber et al.

(10) Patent No.: US 7,183,871 B2
(45) Date of Patent: Feb. 27, 2007

(54) BI-DIRECTIONAL ACCESS POINT

(75) Inventors: Martin Sperber, Coral Springs, FL (US); Shaun Shariatmadar, Boca Raton, FL (US)

(73) Assignee: Viewsonics, Inc, Pompano Beach, FL (US)

( * ) Notice: Subject to any disclaimer, the term of this patent is extended or adjusted under 35 U.S.C. 154(b) by 872 days.

(21) Appl. No.: 09/851,371

(22) Filed: May 7, 2001

(65) Prior Publication Data

US 2002/0194617 A1    Dec. 19, 2002

(51) Int. Cl.
*H03H 7/38* (2006.01)

(52) U.S. Cl. .......................... 333/17.3; 333/32; 333/35

(58) Field of Classification Search ................ 333/131, 333/119, 17.3, 32; 340/310.05, 310.07
See application file for complete search history.

(56) References Cited

U.S. PATENT DOCUMENTS

| | | | |
|---|---|---|---|
| 3,711,767 A | 1/1973 | Campbell, Jr. et al. | ....... 324/51 |
| 3,798,541 A | 3/1974 | Campbell, Jr. et al. | .... 324/72.5 |
| 4,075,430 A | 2/1978 | Reines | ...................... 179/18 J |
| 4,081,613 A | 3/1978 | Reines et al. | ............. 179/18 J |
| 4,263,550 A | 4/1981 | Schweitzer, Jr. | ............ 324/133 |
| 4,283,678 A | 8/1981 | Halter | .................... 324/140 R |
| 4,581,577 A | 4/1986 | Nowosad et al. | .............. 324/66 |
| 4,636,771 A * | 1/1987 | Ochs | ...................... 340/310.05 |
| 5,677,633 A | 10/1997 | Moser et al. | ................ 324/539 |
| 5,744,965 A | 4/1998 | Miller et al. | ................. 324/538 |
| 5,886,530 A | 3/1999 | Fasnacht et al. | ............ 324/611 |
| 5,889,399 A | 3/1999 | Schweitzer, Jr. | ............ 324/133 |
| 5,990,687 A | 11/1999 | Williams | ..................... 324/529 |
| 5,999,002 A | 12/1999 | Fasnacht et al. | ............ 324/525 |

* cited by examiner

*Primary Examiner*—Robert Pascal
*Assistant Examiner*—Kimberly E Glenn
(74) *Attorney, Agent, or Firm*—Sonnenschein Nath & Rosenthal; Brian R. McGinley

(57) ABSTRACT

An improved bi-directional access point includes an impedance boosting section in conjunction with an interface section to a bi-directional communication path. The impedance boosting section incorporates a transformer tap output that couples to an access connection point where signals on the bi-directional communication path may be monitored. The impedance boosting section may be a tapped transformer winding that includes N1 turns above the winding tap and N2 turns below the winding tap, where N1>N2. The interface section may be implemented as a resistive interface section. Additionally, the bi-directional access point may further include a tuning section for the access connection point. Implemented as a resistive network, for example, the tuning section may help establish a tap value and return loss through the access connection point below a prescribed level (e.g.,−20 dB).

15 Claims, 5 Drawing Sheets

US 7,183,871 B2

BI-DIRECTIONAL ACCESS POINT

BACKGROUND OF THE INVENTION

The present invention relates to electrical signal path access, testing, and monitoring. In particular, the present invention relates to an access point that provides a minimal load interface to a bi-directional communication path.

In the RF communications field and in particular, broadband technologies such as Cable TV (CATV), there exists a need to monitor and set proper RF signal levels at various points in a system. When a CATV system, for example, is operational, it is undesirable to disconnect the system coaxial cable or electronic hardware (e.g., amplifiers, modulators or passive devices) carrying service to subscribers. A non-invasive method is needed to establish or adjust signal levels in an active CATV system.

In a CATV system, signals can flow both downstream from the CATV head end to the subscriber as well as upstream from the subscriber's set top terminal back to the head end. These two groups of signals are in different frequency bands. Downstream signals typically occupy the frequency range of 54 MHz to 1000 GHz and the upstream signals typically occupy the frequency range of 5 MHz to 42 MHz. Thus, test point circuitry needs to meet operational specifications over these frequency ranges and also provide access to signals traveling in either direction.

Test point circuitry for operational CATV systems has been developed to avoid potential disruption of service when a technician or engineer needs to monitor RF signals in the system. In the past, resistive tap and directional coupler tap circuits have been implemented in the CATV industry. These circuits attempt to meet the following desired performance requirements for a signal monitoring test point: (1) minimal loading, or power loss, of the through signal being monitored (less than 0.5 dB), (2) a tap value (typically 20 dB or 30 dB) having an accuracy of +/−0.5 dB over the frequency range of interest (typically 5 MHz to 1000 MHz for a CATV system), and (3) test point port and through signal port(s) Return Loss (RL) of −20 dB or better.

One of the disadvantages associated with the use of a directional coupler for a bi-directional application is that it requires placing two directional couplers in cascade, each oriented to receive the desired signal flow from opposite directions. A direct result is that the insertion loss is twice as great. Because a 20 dB or 30 dB directional coupler has approximately 0.8 dB of through loss, the combined loss would be approximately 1.6 dB, which is unacceptably large.

For the CATV systems, the standard coaxial cable impedance (Z) is 75 ohms. A network analyzer indirectly measures disruptions of Z by reading a reflection coefficient typically expressed in decibels (dB). This dB reading is known as return loss (RL). No disturbance of Z means there is no reflected signal energy due (i.e., RL=−60 dB or less) due to a mismatch (e.g., an improper cable termination). A short or open circuit condition creates a radical disturbance of Z and reflects nearly 100% of signal energy (i.e., RL=0 dB).

Ideal resistive tap performance meets the criteria given above. In other words, an analysis of the ideal performance of a resistive tap shows that the resistive tap can provide a tap value of exactly −30 dB, with 0.27 dB of insertion loss, a through line match better than −30 dB, and a test port match at least as good as −20 dB. However, an ideal resistive tap cannot be constructed due to parasitic capacitances and lead inductances associated with the resistive tap components, printed circuit board layout, and other physical factors.

A realistic depiction of a resistive tap is shown in FIG. 1. The resistive tap 100 is coupled to the bi-directional CATV cable 102. The CATV cable 102 runs between ports 1 and 3, while the resistive tap 100 provides the output port 2. The resistors R11 and R12 provide the underlying resistive divider, and L11, L12, L13, C12 are used to tune out parasitics (including C11) and can range in value over a wide spectrum, including nearly zero. R13 is required to assure proper back match at port 2. An analysis of the resistive tap 100 yields the response curves shown in FIGS. 2 and 3. FIG. 2 shows an insertion loss curve 202, port 1 back matching curve 204, and port 3 back matching curve 206. FIG. 3 shows a port 2 back matching curve 302 and a tap value curve 304.

Note that, as shown in FIG. 2, the insertion loss 202 (i.e., the through signal loss caused by the resistive tap) is −0.58 dB. A resistive divider thus presents an undesirable insertion loss and is generally not suitable for use across the wide frequency range of interest in CATV systems.

A need has long existed in the industry for a bi-directional access point that addresses the problems noted above and others previously experienced.

BRIEF SUMMARY OF THE INVENTION

An improved bi-directional access point is arrived at by using an impedance boosting section in conjunction with an interface section to a bi-directional communication path. The impedance boosting section incorporates an access point tap output that couples to an access connection point where signals on the bi-directional communication path may be monitored.

As an example, the impedance boosting section may be a tapped transformer winding. The transform winding generally includes N1 turns above the winding tap and N2 turns below the winding tap, where N1>N2. As will be explained in more detail below, the impedance boosting section allows the bi-directional access point to maintain excellent performance across a wide frequency range (e.g., from 5 MHz to 1 GHz).

The interface section may be implemented as a resistive interface section. For example, one or more series resistors may provide the interface to the bi-directional communication path. Additionally, the bi-directional access point may further include a tuning section comprising a resistive divider for the access connection point. Implemented as a resistive network, for example, the tuning section may help establish a return loss through the access connection point below a prescribed level (e.g., −20 dB). The tuning section simultaneously facilitates a fine adjustment of the tap value.

Other implementations, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE INVENTION

Figure 1:
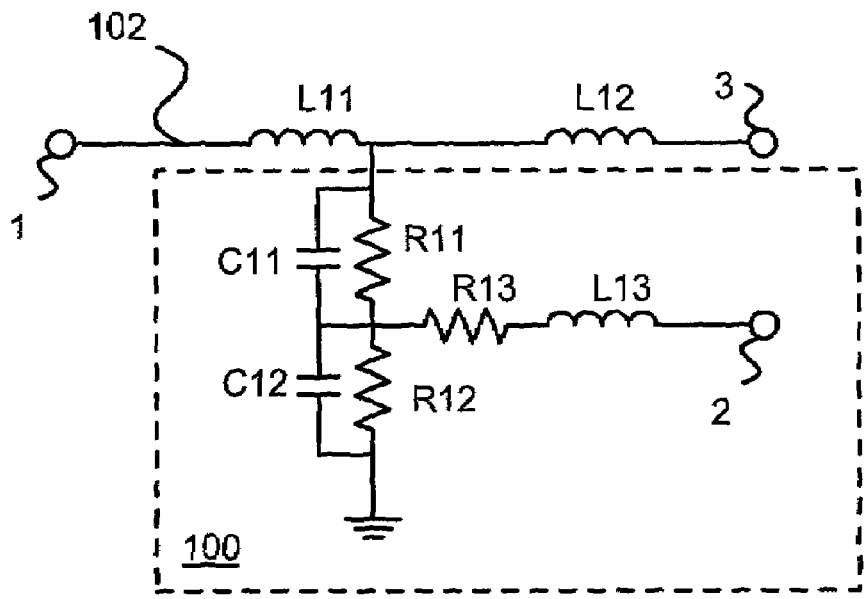
FIG. 1 illustrates a resistive tap including parasitics.
Figure 4:
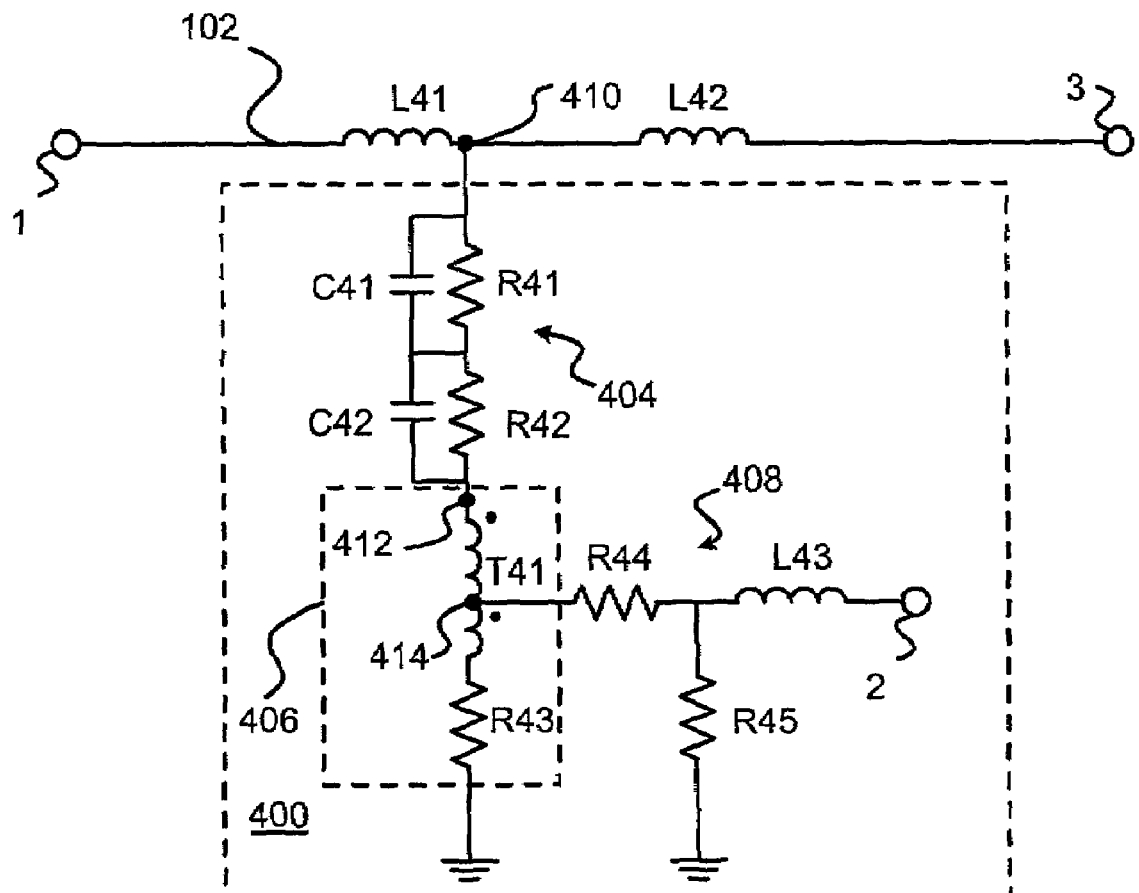
FIG. 4 shows a bi-directional access point.
Figure 2:
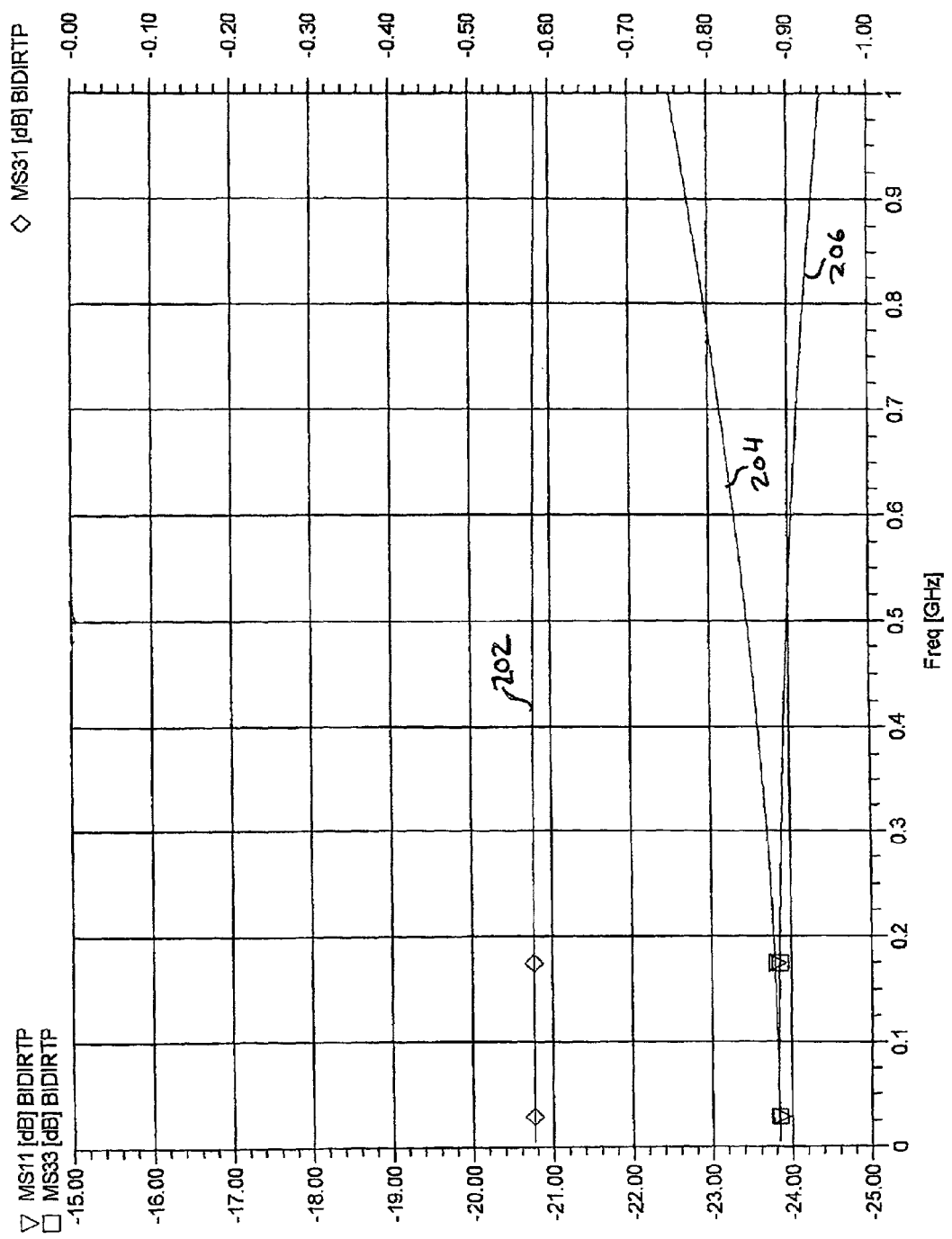
FIG. 2 shows response curves for the resistive tap in FIG. 1.
Figure 3:
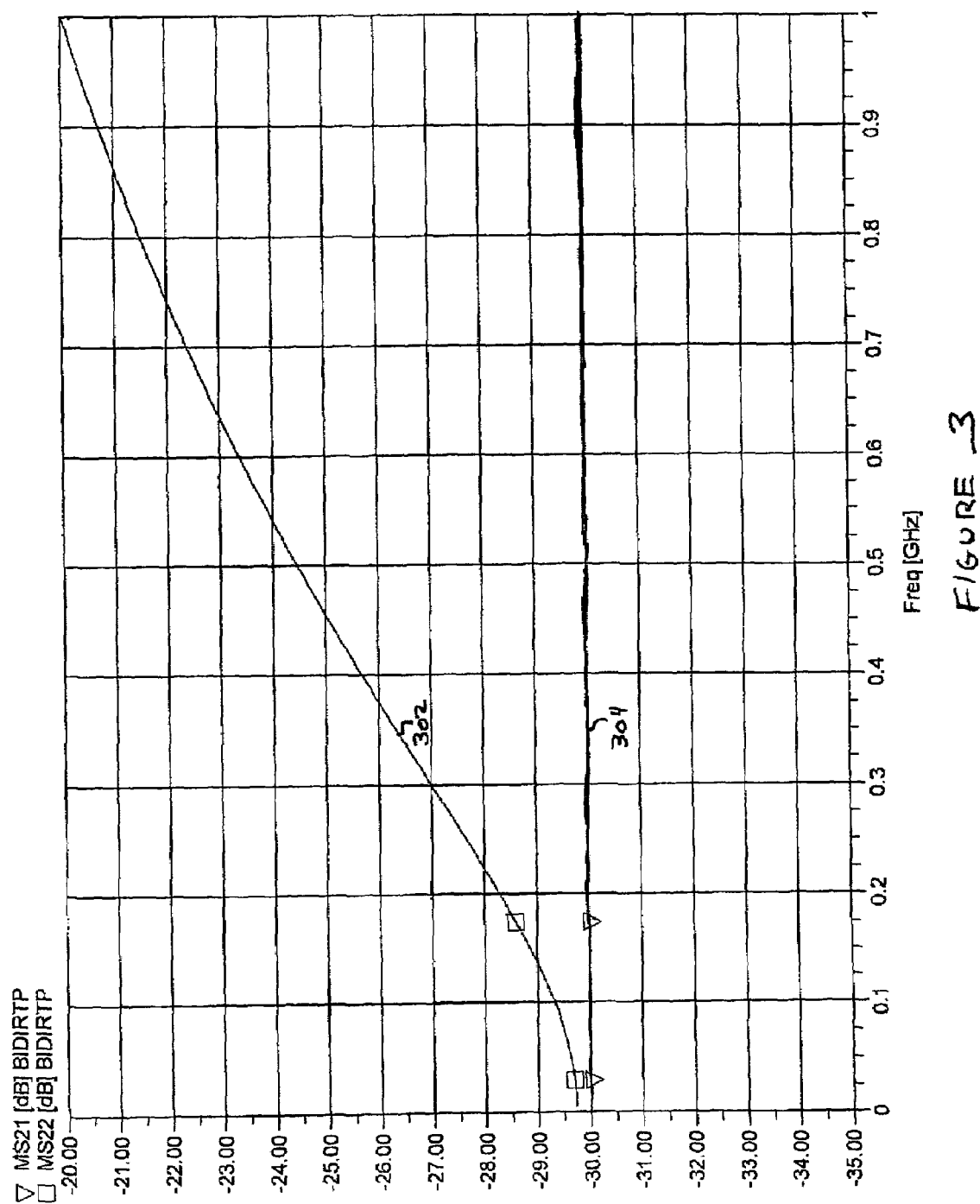
FIG. 3 shows additional response curves for the resistive tap in FIG. 1.

Turning now to FIG. 4, that figure illustrates a bi-directional access point 400 ("access point 400"). The access point 400 couples to the bi-directional communication path 102 (including parasitic inductances L41 and L42) as an aid for testing, monitoring, and the like through the access connection point 2. The access point 400 includes an interface section 404, an impedance boosting section 406, and a tuning section 408.

The interface section 404 includes the resistor R41 in series with R42. Parasitic capacitances C41 and C42 are also present. Although R41 and R42 may be replaced with a single resistor, using resistors in series places their associated parasitic capacitances in series as well (thereby lowering the overall parasitic effect). The interface section 404 connects to the bi-directional communication path 102 through the bridging connection 410 (e.g., a hardwired connection installed with a CATV system or in a passive device, or as a signal connector in a test fixture).

The impedance boosting section 406 couples to the interface section 404 at the interface output connection 412 and provides an access point transformer tap output 414. A resistor, R43, to ground completes a voltage divider initiated with the interface section 404 and raises the impedance of the transformer tap. The impedance boosting section 406 is preferably formed from a tapped transformer winding T41. In particular, the winding may be made from copper enamel coated wire (e.g., AWG #34 magnet wire), wound on a binocular ferrite core (e.g., a Ferronics 12-814B, made of permeability 5000 material, 0.066"×0.138"). The binocular core includes two parallel winding holes in the core cross section. A loop through one hole and back through the second hole provides a single turn of N2. In the same direction, N1 turns are wound such that start of the N1 turns and the end of the N2 turns coincide (note the phasing dots indicative of magnetic polarity shown in FIG. 4).

The transformer winding T41 includes N1 turns above the tap and N2 turns below the tap, where N1>N2. As one example, N1 may be 6 while N2 may be 1 (for a −30 dB tap value) or 2 (for a −20 dB tap value). N2 may be further increased to provide a corresponding decrease in the tap value (e.g., a −10 dB tap value), and it will be appreciated by one of skill in the art that the component values of FIG. 4 will need commensurate adjustment. The transformer winding T41 presents an impedance boost of $(N1/N2)^{79}$ 2 times the impedance looking out of the tap toward the access connection point 2 (ideally 75 ohms in a CATV system). That is, the impedance boosting section 406 acts as an additional impedance in series with the interface section 404.

Note however, that the access point 400 is not limited to use with 75 ohm CATV systems. Rather, the access point 400 finds general application in many types of bi-directional communication systems, including, for example, those using 50 ohm communication path impedance.

As noted above, the access point 400 also includes the tuning section 408. As illustrated in FIG. 4, the tuning section 408 includes the resistor R44 in series with the access connection point 2 and the resistor R45 from the access connection point 2 to ground. The inductance L43 is a parasitic output tuning inductance. The resistors R45 and R44 may be adjusted to bring the return loss associated with the access connection point 2 below a desired threshold level over frequency, while also helping to set the tap value. Thus, for example, the tuning section 408 may be adjusted to provide a return loss of less than −20 dB by matching the impedance looking into the access connection point 2 with circuitry coupled to the access connection point 2 for testing or monitoring purposes.

Given the structure of the bi-directional access point 400, an optimization program may be used to determine component values that achieve specified performance criteria. For example, Compact Software's ARRL Radio Designer software may be used with the netlist and performance criteria shown in Table 1 to obtain the components values shown in Table 2.

TABLE 1

| Netlist line | | | Comment |
|---|---|---|---|
| BLK | | | |
| IND 1 | 10 L=?663.853E-6NH? | | L41 |
| IND 10 | 100 L=?16.1223E-6NH? | | L42 |
| R1:680 | | | |
| C1:?.15PF? | | | |
| RES 10 | 15 R=R1 | | R41 |
| RES 15 | 20 R=R1 | | R42 |
| CAP 10 | 15 C=C1 | | C41 |
| CAP 15 | 20 C=C1 | | C42 |
| TRF 20 | 25 25 | 30, N=(7/1) | T41 |
| ONE 20 | 30 ONE1 | | |
| RES 30 | 0 R=?150? | | R43 |
| RES 25 | 45 R=6.2 | | R44 |
| RES 45 | 0 R=240 | | R45 |
| IND 45 | 50 L=?398.49E-6NH? | | L43 |
| BIDIRTP:3POR | 1 50 100 | | |
| END | | | |
| FREQ | | | |
| ESTP 5 MHZ | 1000 MHZ 511 | | |
| END | | | |
| OPT | | | |
| BIDIRTP | R1=75 | R2=75 | |
| F=5 MHZ | 1000 MHZ | | |
| MS11=−20 DB LT | MS33=−20 DB LT | | |
| MS31=−.3 DB GT | MS22=−20 DB LT | | |
| MS21=−30 DB | | | |
| TERM=.0001 | | | |
| END | | | |
| DATA | | | |
| ONE1: | S RREF=75 | | |
| *FREQ.MS11,PS11 | | | |
| 5 MHZ .8871 3.38, | | | |
| 50 MHZ .8946 −1.34 | | | |
| 250 MHZ .8414 −3.64 | | | |
| END | | | |

Note that the data block ONE1 characterizes the transformer winding T41. In other words, the data block ONE1 provides the analysis program with the S11 return loss (with magnitude and phase) of the transformer winding T41 over frequency. The analysis program interpolates additional points in the data block as needed.

As shown in Table 1, the specifications state that the port 1 back match is less than −20 dB (MS11=−20 DB LT), the port 3 back match is less than −20 dB, the through loss due to the access point 100 is no greater than −0.3 dB, the access connection point 2 back match is less than −20 dB, and the access point value is −30 dB (i.e., the signal at access connection point 2 is a constant dB below the signal on the bi-directional communication path). As noted above, although access connection point 2 is preferably kept 30 dB down, it may also be set at 20 dB down, or at another level depending on the application. The component values shown in Table 2 provide the response specified in Table 1.

TABLE 2

| Component | Value |
|---|---|
| L41 | approximately 0, but larger depending on the parasitic shunt C across port 1 due to physical connections. |
| L42 | approximately 0, but larger depending on the parasitic shunt C across port 3 due to physical connections. |
| L43 | approximately 0, but larger depending on the parasitic shunt C across port 2 due to physical connections. |
| R41 | 680 ohms |
| R42 | 680 ohms |
| R43 | 150 ohms |
| R44 | 6.2 ohms |
| R45 | 240 ohms |
| C41 | 0.15 pf, estimated parasitic capacitance (rather than physical capacitance) |
| C42 | 0.15 pf, estimated parasitic capacitance (rather than physical capacitance) |

Figure 5:
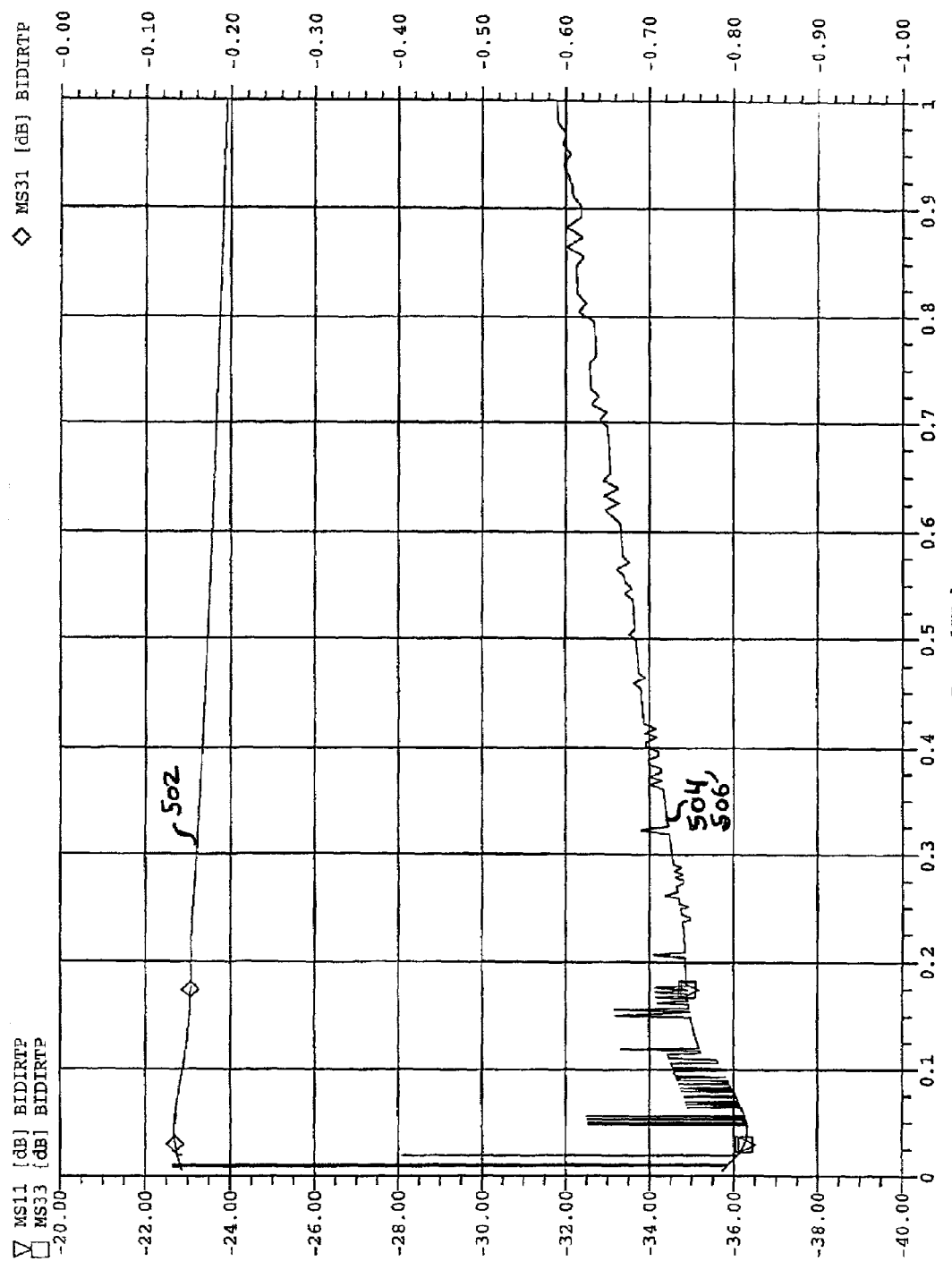
FIG. 5 shows response curves for the bi-directional access point in FIG. 4.
Figure 6:
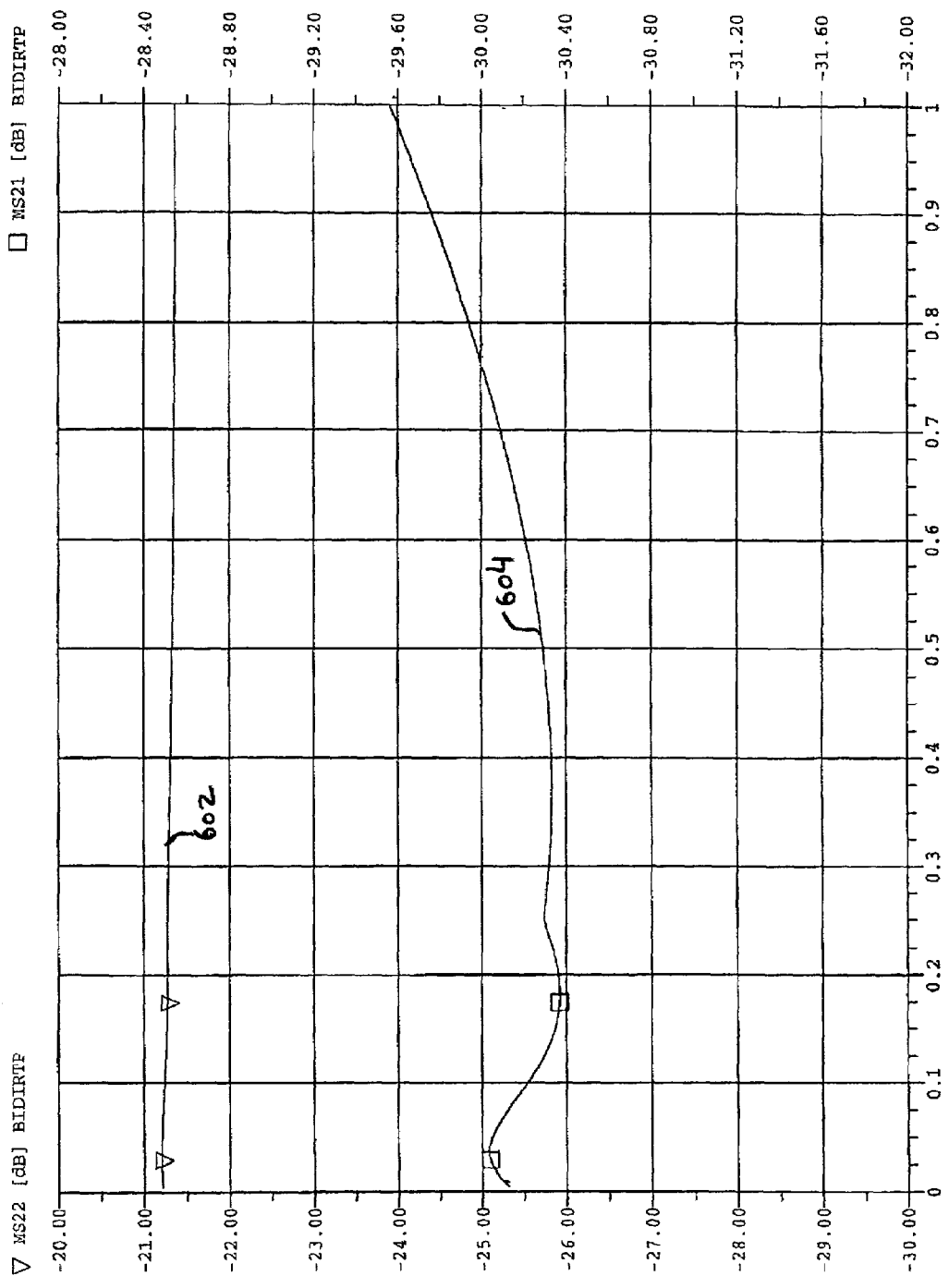
FIG. 6 shows additional response curves for the bi-directional access point in FIG. 4.

FIGS. 5 and 6 present the response of an access point built using the component values shown in Table 2. In particular, FIG. 5 shows an insertion loss curve 502, port 1 back matching curve 504, and port 3 back matching curve 506. FIG. 6 shows an access connection point 2 back matching curve 602 and a tap value curve 604.

Note that, as shown in FIG. 5, the insertion loss 502 (i.e., the through signal loss caused by the resistive tap) is less than −0.2 dB. The access point 100 thus loads the bi-directional communication path 102 very minimally, and even less than an ideal resistive tap (−0.28 dB), let alone a resistive tap as practically implemented (−0.58 dB). Furthermore, the port 1 and port 3 backmatches stay well below −30 dB across frequency, and the access connection point 2 backmatch is under −20 dB. Note also that the tap value curve 604 demonstrates that the tap value stays at −30 dB plus/minus 0.4 dB over the entire frequency range.

Thus, unlike traditional test points, the bi-directional access point 100 provides minimal loss access to a bi-directional communication path 102. The bi-directional access point 100 may be incorporated into another passive or active device (e.g., a signal splitter or an amplifier), or may function in a stand-alone fashion. The bi-directional access point 100 also operates within specification over the entire frequency range of interest in typical CATV systems (5 MHz to 1 GHz).

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Thus, for example, the physical construction of the transformer winding T41 may vary to set a particular tap value. It will be appreciated that new winding may be characterized on an impedance bridge to provide different parameters for the data block in Table 1. Furthermore, depending on the characterization, the access point 400 may also include shunt inductance or capacitance across the winding itself, R43, or in series with R44 to help meet the design goals specified in the optimization program. Therefore, it is intended that the invention not be limited to the particular embodiment disclosed, but that the invention will include all embodiments falling within the scope of the appended claims.

What is claimed is:

1. A bi-directional access point comprising:
an interface section comprising a bridging connection for a bi-directional communication path, and an interface output connection;
an impedance boosting section coupled to the interface output connection, the impedance boosting circuit including a transformer tap output; and
an access connection point coupled to the transformer point tap output,
wherein the impedance boosting section comprises a transformer with a winding tap, and further wherein the transformer winding comprises N1 turns above the winding tap and N2 turns below the winding tap, where N1 >N2.

2. A bi-directional access point according to claim 1, wherein N1/N2 is selected from a range of 2 through 6 commensurate with a preselected tap value ranging between −10 dB and −30 dB.

3. A bi-directional access point according to claim 2, wherein N1/N2 is 6 and the preselected tap value is −30 dB.

4. A bi-directional access point according to claim 2, wherein N1/N2 is 3 and the preselected tap value is −20 dB.

5. A bi-directional access point comprising:
an interface section comprising a bridging connection for a bi-directional communication path, and an interface output connection;
an impedance boosting section coupled to the interface output connection, the impedance boosting circuit including a transformer tap output; and
an access connection point coupled to the transformer point tap output, wherein the interface section is a resistive interface section.

6. A bi-directional access point according to claim 5, wherein the resistive interface section comprising at least first and second resistors in series.

7. A method for monitoring a bi-directional communication path, the method comprising:
establishing a bridging connection from a bi-directional communication path through an interface section to an interface output connection;
providing an impedance boosting section coupled to the interface output connection, the impedance boosting circuit including a transformer tap output; and providing an access connection point to the access point tap output,
wherein providing an impedance boosting section comprises providing a transformer winding with a winding tap, and further wherein providing a transformer winding comprises providing a transformer winding with N1 turns above the winding tap and N2 turns below the winding tap, where N1 >N2.

8. A method according to claim 7, wherein providing a transformer winding comprises providing a transformer winding in which N1/N2 is selected from a range of 2 through 6 commensurate with a preselected tap value ranging between −10 dB and −30 dB.

9. A method according to claim 8, wherein N1/N2 is 3 and the preselected tap value is −20 dB.

10. A method according to claim 8, wherein N1/N2 is 6 and the preselected tap value is −30 dB.

11. A method for monitoring a bi-directional communication path, the method comprising:

establishing a bridging connection from a bi-directional communication path through an interface section to an interface output connection;
providing an impedance boosting section coupled to the interface output connection, the impedance boosting circuit including a transformer tap output; and
providing an access connection point to the access point tap output,
wherein establishing a bridging connection comprises establishing the bridging connection through a resistive interface section.

12. A bi-directional access point comprising:
interface means for establishing a bridging connection from a bi-directional communication path to an interface output connection;
impedance boosting means coupled to the interface output connection for adding an impedance boost in series with the interface means;
a transformer tap output coupled to the impedance boosting means;
a tuning means for establishing at least one of a predetermined return loss and tap value for an access connection point; and
the access connection point coupled to the transformer tap output,
wherein the impedance boosting means includes a transformer winding with a winding tap.

13. A bi-directional access point comprising:
interface means for establishing a bridging connection from a bi-directional communication path to an interface output connection;
impedance boosting means coupled to the interface output connection for adding an impedance boost in series with the interface means;
a transformer tap output coupled to the impedance boosting means; and
an access connection point coupled to the transformer tap output,
wherein the impedance boost is commensurate with a preselected tap value ranging between −10 dB and −30 dB.

14. A bi-directional access point according to claim 13, wherein the impedance boost is commensurate with a tap value of −30 dB.

15. A bi-directional access point according to claim 13, wherein the impedance boost is commensurate with a tap value of −20 dB.

* * * * *